United States Patent
Miller et al.

(10) Patent No.: US 10,214,254 B2
(45) Date of Patent: Feb. 26, 2019

(54) DRAG REDUCING DEVICE

(71) Applicant: Aero Industries, Inc., Indianapolis, IN (US)

(72) Inventors: Hunter Miller, Indianapolis, IN (US); John Vogel, Naples, FL (US); James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 15/725,828

(22) Filed: Oct. 5, 2017

(65) Prior Publication Data
US 2018/0093715 A1   Apr. 5, 2018

Related U.S. Application Data

(60) Provisional application No. 62/404,289, filed on Oct. 5, 2016.

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC ..... B62D 35/001; B62D 35/007; B62D 33/04
USPC ................. 296/180.1, 180.3–180.5
See application file for complete search history.

(56) References Cited

U.S. PATENT DOCUMENTS

| 9,079,623 B2 * | 7/2015 | Bernhardt | B62D 35/001 |
| 9,242,683 B2 * | 1/2016 | Dieckmann | B62D 35/001 |
| 9,327,776 B2 * | 5/2016 | Dieckmann | B62D 35/007 |
| 9,708,015 B2 * | 7/2017 | Dieckmann | B62D 35/001 |
| 9,834,261 B2 * | 12/2017 | Dieckmann | B62D 35/007 |
| 9,845,118 B2 * | 12/2017 | Dieckmann | B62D 35/007 |
| 2008/0048468 A1 | 2/2008 | Holubar | |
| 2008/0093886 A1 | 4/2008 | Nusbaum | |
| 2013/0076064 A1 | 3/2013 | Smith et al. | |
| 2014/0346808 A1 * | 11/2014 | Bernhardt | B62D 35/001 296/180.4 |
| 2015/0097393 A1 * | 4/2015 | Dieckmann | B62D 35/007 296/180.4 |
| 2015/0102633 A1 * | 4/2015 | Dieckmann | B62D 35/001 296/180.1 |
| 2015/0329152 A1 | 11/2015 | Baker et al. | |
| 2015/0360735 A1 | 12/2015 | Butler et al. | |
| 2016/0068200 A1 | 3/2016 | Dieckmann et al. | |

(Continued)

OTHER PUBLICATIONS

International Search Report and Written Opinion corresponding to international application No. PCT/US2017/55340 dated Mar. 6, 2018 (11 pages).

*Primary Examiner* — Dennis H Pedder
(74) *Attorney, Agent, or Firm* — Maginot, Moore & Beck, LLP

(57) ABSTRACT

A drag reducing device for a vehicle body having a top wall and a door pivotably mounted to the rear of the body to open toward a side wall of the body, includes a wing sized and configured to turn airflow across the top wall of the body, the wing having a trailing edge and a proximal edge; and an assembly mounted to the door and configured for pivoting the wing so that the trailing edge of the wing is pivoted upward to a position above the top wall of the vehicle body when the door is open and for pivoting the wing so that the trailing edge of the wing is pivoted downward to a position below the top wall of the vehicle body when the door is closed.

9 Claims, 12 Drawing Sheets

(56) References Cited

U.S. PATENT DOCUMENTS

2016/0304138 A1\* 10/2016 Dieckmann .......... B62D 35/007
2016/0347380 A1\* 12/2016 Dieckmann .......... B62D 35/007
2017/0021873 A1\*  1/2017 Dieckmann .......... B62D 35/001
2017/0334491 A1\* 11/2017 Dieckmann .......... B62D 35/001
2018/0290694 A1\* 10/2018 Grosse ................. B62D 35/001

\* cited by examiner

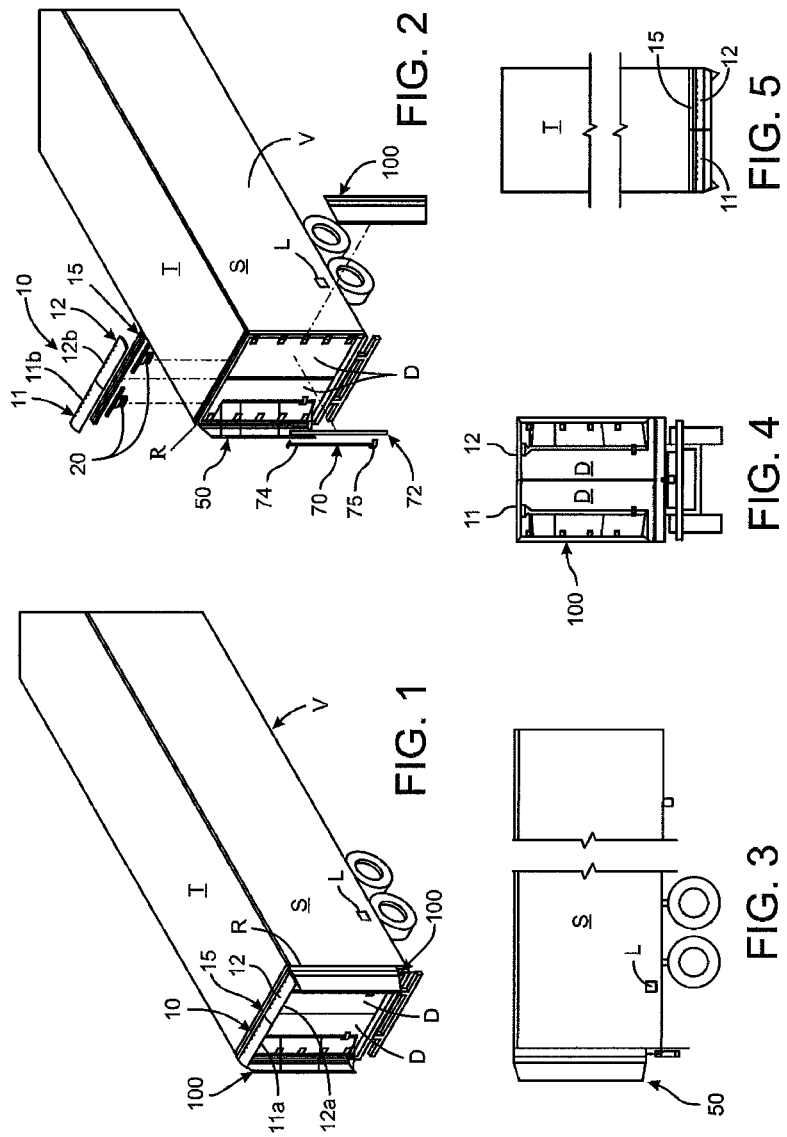

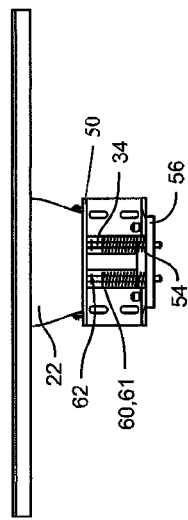
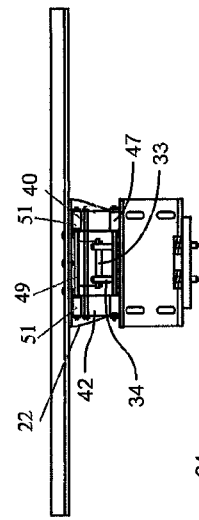
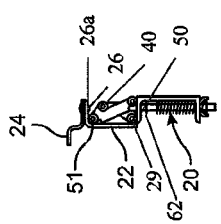
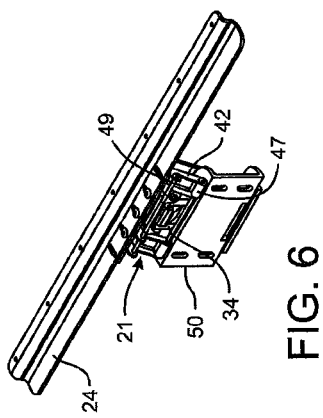
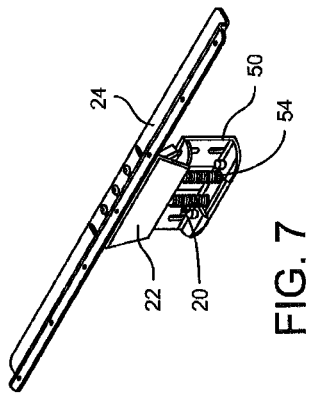

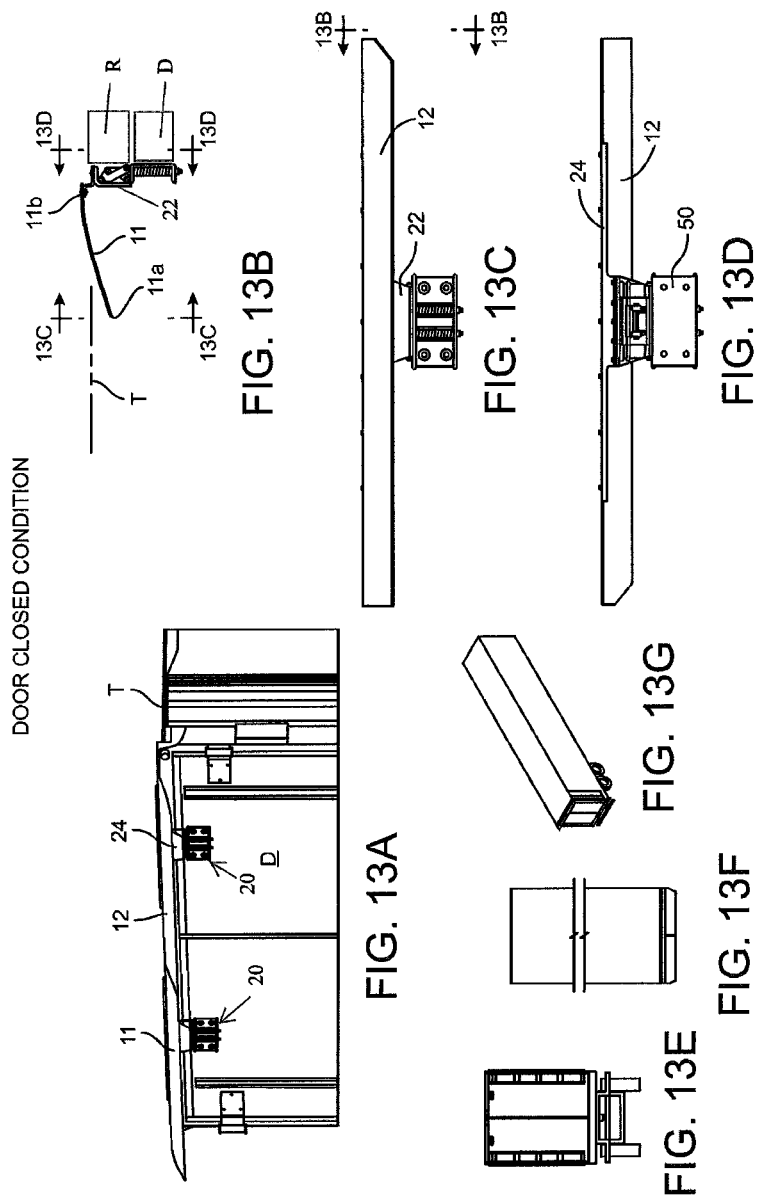

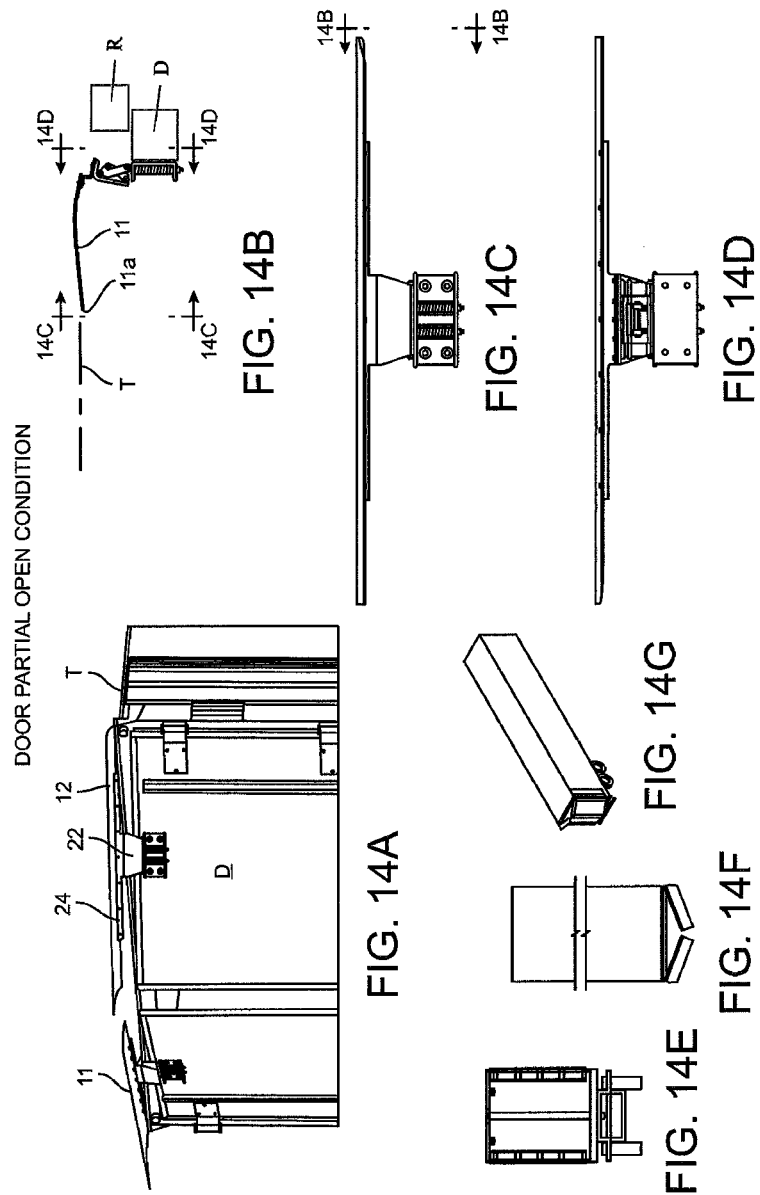

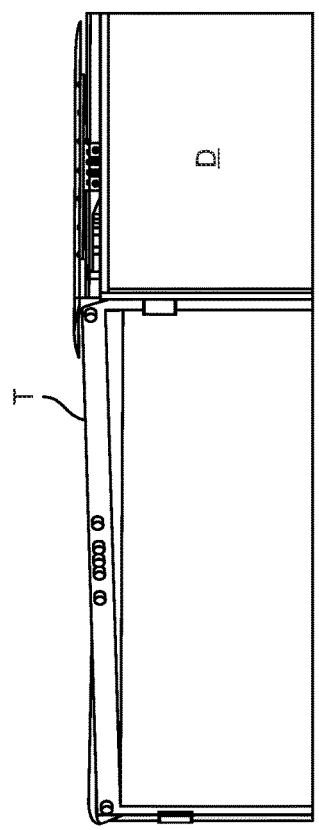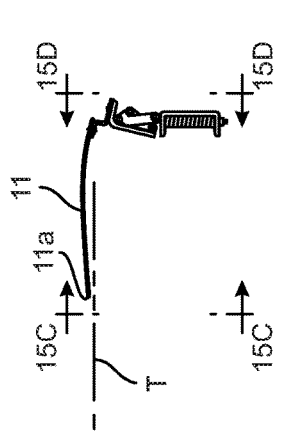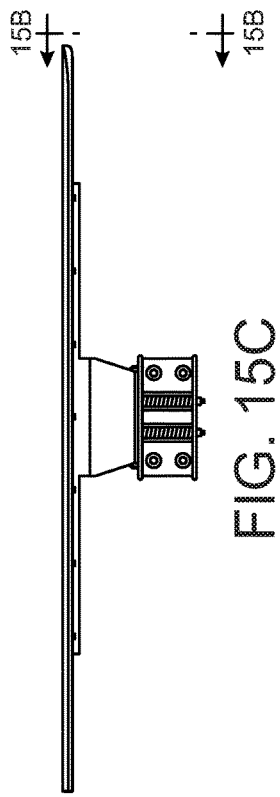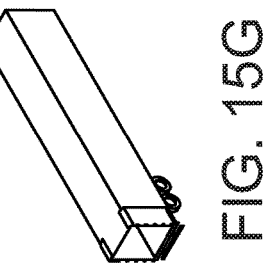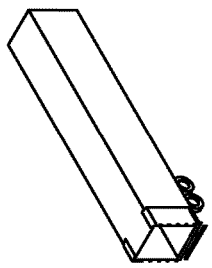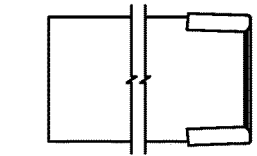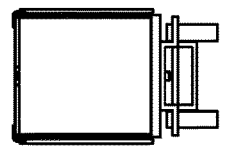

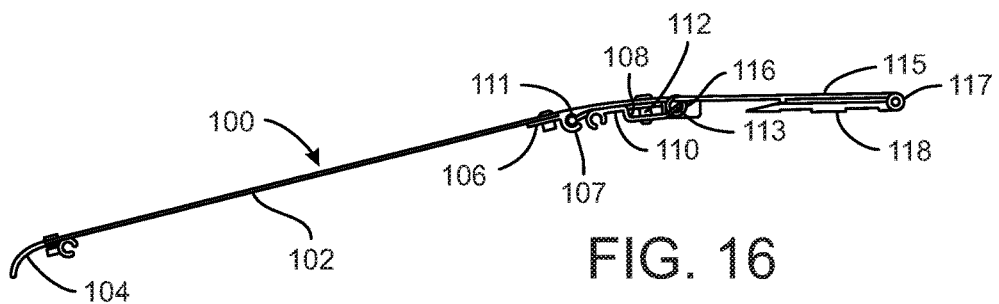
FIG. 16
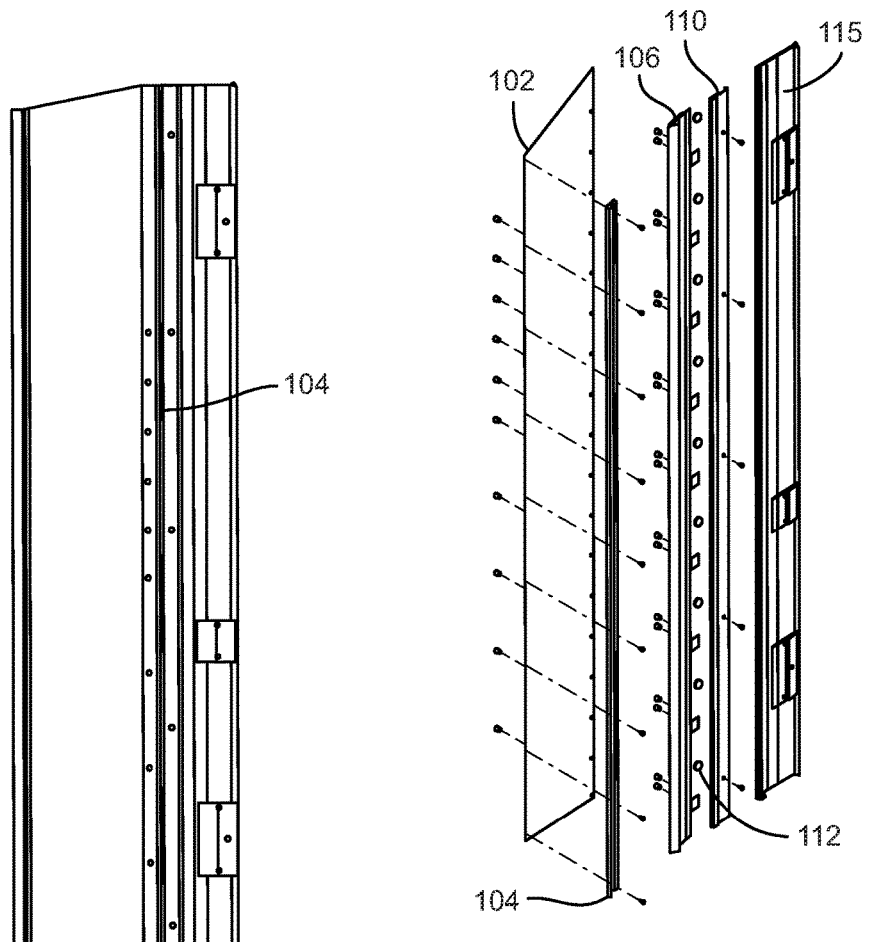
FIG. 17
FIG. 18

DRAG REDUCING DEVICE

REFERENCE TO RELATED APPLICATION

This application is a non-provisional filing of and claims priority to provisional application No. 62/404,289, filed on Oct. 5, 2016, the entire disclosure of which is incorporated herein by reference.

BACKGROUND

The present disclosure relates to drag reduction devices for land vehicles, such as trucks, tractor-trailer rigs, vans, buses, recreational vehicles and similar vehicles having a large frontal area.

Fuel economy is a persistent concern for all land vehicles and is particularly acute for large vehicles such as trucks and tractor-trailer rigs. Fuel economy improvements have been achieved by innovation in engine design and improvements in fuel composition. However, the size and shape of the vehicles plays a substantial role in fuel economy. Ultimately, drag is the greatest enemy to fuel economy, with as much as 70% of the engine power devoted to cutting through the air in front of the vehicle.

Drag is a force that resists the movement of a body through a fluid, whether the body is a baseball and the fluid is air, or the body is a swimmer moving through water. Drag is a function of two components—friction drag and pressure drag. Friction drag is a force that acts tangential to a surface of the body. Friction drag is increased by irregularities or roughness on the surface and decreased by making the surface more slippery. A clean truck cuts through the air more efficiently and with less friction drag than a dirty truck.

Pressure drag is a force that acts perpendicular to a surface and is a function of the surface area in the direction of travel as well as the velocity or speed at which the body is traveling. Pressure drag increases as the square of velocity so that doubling vehicle speed actually creates four times more pressure drag. On the other hand, pressure drag is directly related to surface area so that a ten percent reduction in surface area leads to a ten percent decrease in pressure drag.

For aerodynamically configured vehicles, such as airplanes, friction drag contributes more heavily to overall drag than pressure drag. However, for land vehicles this relationship is reversed significantly. For a typical tractor-trailer, pressure drag can be as much as ten times greater than friction drag due to the large frontal surface area of the truck. Unfortunately, the size of these types of vehicles is dictated by their function—hauling products or materials. Unlike passenger vehicles, the box-like shape of trucks cannot be significantly altered. A smaller frontal surface area means a smaller truck, which means less cargo that can be hauled. Pressure drag in land vehicles, and especially in trucks, is increased by pressure "hot spots", such beneath the undercarriage, behind the rear of the trailer or between the tractor and the trailer. These hot spots are generally regions of low pressure, which causes air flowing over the vehicle to deviate from a streamlined path around the vehicle. Vortices can form in these hot spots that significantly increase the pressure drag.

In quantitative terms, if a square body has a drag coefficient ($C_D$) of 1.00, elongating the body into a rectangular shape reduces $C_D$ to 0.80. Adding a rounded nose cuts the coefficient in half to 0.40. Adding a "boat tail" or a conical tail decreases $C_D$ further to 0.20. The typical boattail configuration includes plates projecting from the rear of the vehicle and angled inwardly at an angle of 10-15°. An elliptical body tapered at both ends produces a drag coefficient less than 0.05, but the shape significantly reduces available cargo space and is difficult to produce.

It has been estimated that a 20% reduction in drag yields at least a 10% increase in fuel economy at highway speeds. For truckers and trucking companies, this increase in fuel economy means significantly reduced fuel costs year in and year out. For the environment, increases in fuel economy mean fewer deleterious emissions. A significant amount of effort has been expended in developing drag reduction technology for trucks. These efforts include streamlining the tractor, introducing seals, air deflectors or vortex generators in the gap between the tractor and trailer, and adding undercarriage skirts, guide vanes, air deflectors and boat tails to the trailer. Each of these modifications contributes in some measure to the overall drag reduction, so a fully optimized rig will incorporate a number of these improvements.

Presently, the typical drag reduction device utilizes "mechanical" redirection of the air flow to reduce drag. For instance, one type of device utilizes spoilers or fairings mounted to the top trailing edge of a vehicle or trailer to redirect the airflow and attempt to reduce turbulence. Another drag reduction device is the boat tail device that includes boat tail plates extending rearward from the rear of the trailer. Boat tail devices can reduce drag by up to ten percent. The typical boat tail is a large shell that is mounted over the rear doors of the trailer. Such devices are cumbersome to install and remove. Moreover, the large unitary shell is difficult to store when access to the rear doors is desired, such as to unload the trailer.

Other "mechanical" drag reduction devices require intervention by the vehicle operator to deploy and stow the device, while still other mechanical approaches require the vehicle operator to manipulate the drag reduction device to access the rear doors of the vehicle or trailer. Some mechanical devices are mounted directly to the vehicle/trailer doors which can eliminate the need to manipulate the device in order to access the trailer door. However, these devices are bulky and prevent the trailer/vehicle door from being fully opened flat against the side wall of the trailer/vehicle. This discrepancy can pose significant risks at shipping/receiving locations where trucks are backed in to closely spaced loading docks. A door that projects too far away from the side of the trailer can be struck by an adjacent vehicle as it attempts to back into an adjacent loading dock.

Whether the actuator is mechanical or non-mechanical, there is a persistent need for a drag reduction device that does not impede the ability to open the rear doors of a trailer or truck on which the device is mounted. Moreover, in order to ensure that the drag reduction device is consistently used, the device should be "automatic", meaning that it does not require any intervention by the vehicle operator to deploy or to position the device clear of the vehicle/trailer doors when access is desired for loading or unloading the vehicle. There is also a need for a drag reduction device that has a lower profile when the rear doors are open than existing devices—i.e., that fits within the space between the open door and the side of the trailer or vehicle.

SUMMARY

A drag reducing device is provided for a vehicle body having a top wall and a door pivotably mounted to the rear of the body to open toward a side wall of the body, that includes a wing sized and configured to turn airflow across the top wall of the body, the wing having a trailing edge and a proximal edge; and an assembly mounted to the door and configured for pivoting the wing so that the trailing edge of the wing is pivoted upward to a position above the top wall of the vehicle body when the door is open and for pivoting the wing so that the trailing edge of the wing is pivoted downward to a position below the top wall of the vehicle body when the door is closed.

In one aspect, the assembly for pivoting the wing includes a mounting plate on which the wing is mounted adjacent the proximal edge of the wing, a base plate mounted to the door below the top wall of the vehicle body, a pivot plate fastened to the mounting plate and arranged to contact the vehicle body at the top wall when the door is closed, the pivot plate pivotably connected to the base plate so that the pivot plate is pivotable between a deployed position when the pivot plate contacts the vehicle body and a stowed position when the pivot plate is moved with the door away from the vehicle body toward the side wall of the vehicle body, and a spring member arranged between the base plate and the pivot plate to bias the pivot plate to the stowed position In the stowed position the trailing edge of the wing is above the top wall of the vehicle body and in the deployed position the trailing edge of the wing is below the top wall of the vehicle body.

In a further aspect, a drag reducing device is provided for a vehicle body having a side wall and a door pivotably mounted to a door frame fixed to the rear of the body to open toward the side wall, that includes a side wing assembly pivotably mounted to the door frame adjacent the side wall. The side wing assembly includes a hinge plate pivotably mounted to the door frame and extending rearward from the rear of the vehicle body, and a panel pivotably mounted to the hinge plate to pivot about a vertical axis relative to the vehicle body, the panel mounted to the hinge plate at a forward edge of the panel and arranged so that a rear edge of the panel extends rearward from the vehicle body in a deployed configuration. At least one first flexible lanyard is connected between the hinge plate and the door, and at least one second flexible lanyard connected between the door and the panel adjacent the rear edge of the panel.

DESCRIPTION OF THE FIGURES

FIG. 1 is a perspective view of the rear of a vehicle or trailer with a drag reduction device mounted thereon.

FIG. 2 is the perspective view shown in FIG. 1, depicted with the drag reduction device in partially exploded view.

FIG. 3 is a side view of the vehicle and device shown in FIG. 2 with the rear door closed and the drag reduction device deployed.

FIG. 4 is an end view of the vehicle and device depicted in FIGS. 1-3.

FIG. 5 is a top view of the vehicle and device depicted in FIGS. 1-3.

FIG. 6 is a rear perspective view of a top wing assembly of the drag reduction device shown in the prior figures.

FIG. 7 is a front perspective view of a top wing assembly shown in FIG. 6.

FIG. 8 is a rear view of the top wing assembly shown in FIG. 6.

FIG. 9 is a front view of the top wing assembly shown in FIG. 7.

FIG. 10 is a side view of the top wing assembly shown in FIG. 6.

FIG. 13 includes several view of the drag reduction device shown in the deployed position when the rear doors of the vehicle are closed.

FIG. 14 includes several view of the drag reduction device shown in a partially opened position when the rear doors of the vehicle are partially opened.

FIG. 15 includes several view of the drag reduction device shown in the stowed position when the rear doors of the vehicle are fully opened.

FIG. 16 is a top view of a side wing assembly of the drag reduction device depicted in FIG. 1.

FIG. 17 is a side view of the side wing assembly shown in FIG. 16.

FIG. 18 is an exploded view of the side wing assembly shown in FIG. 17.

DETAILED DESCRIPTION

Figure 12:
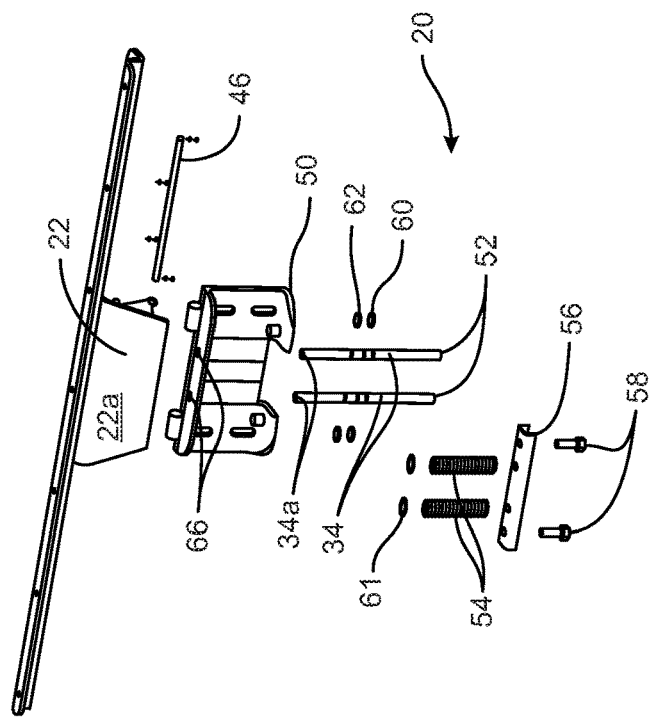
FIG. 12 is an exploded view of a spring assembly for the top wing assembly shown in FIG. 11.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

According to one embodiment shown in FIGS. 1-5, a drag reducing device includes a pair of top wing assemblies 10, one of each pair mounted to a respective one of the rear doors D of a vehicle V, which may be a trailer, van, semi-trailer and the like. A pair of side wing assemblies 100 are also provided, with one each mounted to the rear frame R of the vehicle adjacent to each rear door. As is known in the art, the rear doors D swing outward and toward the side wall S of the vehicle and typically include some form of latch L at the side wall configured to hold the rear door in the fully open position. The rear door is configured so that a narrow gap exists between the side wall S and the door D in the fully open and latched position. The side wing assembly 100 of the dag reducing device of the present disclosure is configured to nestle within that narrow gap without interfering with the ability of the rear door to be fully opened and latched. As noted in FIGS. 3 and 5, the top wing assemblies are configured to extend about 12.0 inches from the rear of the top wall T of the vehicle. The side wing assemblies are configured to extend 20-21 inches from the rear doors. All of the wing assemblies are configured to direct airflow at the rear of the vehicle to reduce drag. It has been found that these dimensions of the components of the drag reducing device provide optimal drag reduction; however, other dimensions for the components may be contemplated. As depicted in FIG. 1, the top wing assemblies overlap the top edges of the side wing assemblies and are preferably arranged substantially flush with the side wing assemblies when the drag reducing device is in its deployed configuration as shown in FIGS. 1-5.

The top wing assemblies 10 include a left wing 11 and a right wing 12, with each wing mounted to a corresponding left and right rear door. The wing assemblies integrate with a gutter foil 15 that is affixed to the top wall T of the vehicle. A single gutter foil is depicted in FIGS. 1-2, but a multi-piece gutter foil is contemplated for use with the top wings 11, 12. The left and right wings 11, 12 are configured to directly abut or slightly overlap the gutter foil in the deployed position to provide a smooth transition for air flow over the top rear of the vehicle. Each wing assembly includes a spring assembly 20 that pivots the wing assemblies from their deployed position to a stowed position, as described herein.

Referring to FIGS. 6-12, details of a top wing assembly 10 are illustrated. Each wing 11 and 12 is supported by a pivot assembly 21, and in particular is fastened adjacent its forward edge 11b, 12b to a corresponding wing mount 24 that is in turn fastened to a flange 26 of a pivot plate 22 by fasteners 25. The wing mount 24 is provided with mounting holes 27 to receive fasteners to affix the wing to the mount. As shown in detail in FIG. 11, the pivot assembly 21 further includes a collar 28 that is configured to receive a pivot rod 29 so that the pivot plate 22 can pivot freely about the rod. The pivot rod 29 also passes through holes 31 in a bottom link 30. The pivot rod is held in place extending through the collar and bottom link by retaining rings 29a snapped onto the ends of the rod in a conventional fashion.

Figure 11:
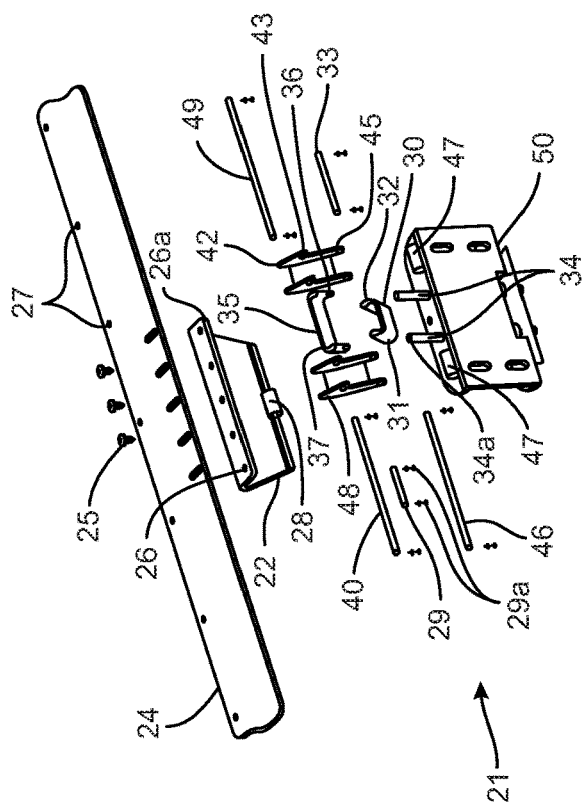
FIG. 11 is an exploded view of the top wing assembly shown in FIG. 6.
Figure 19:
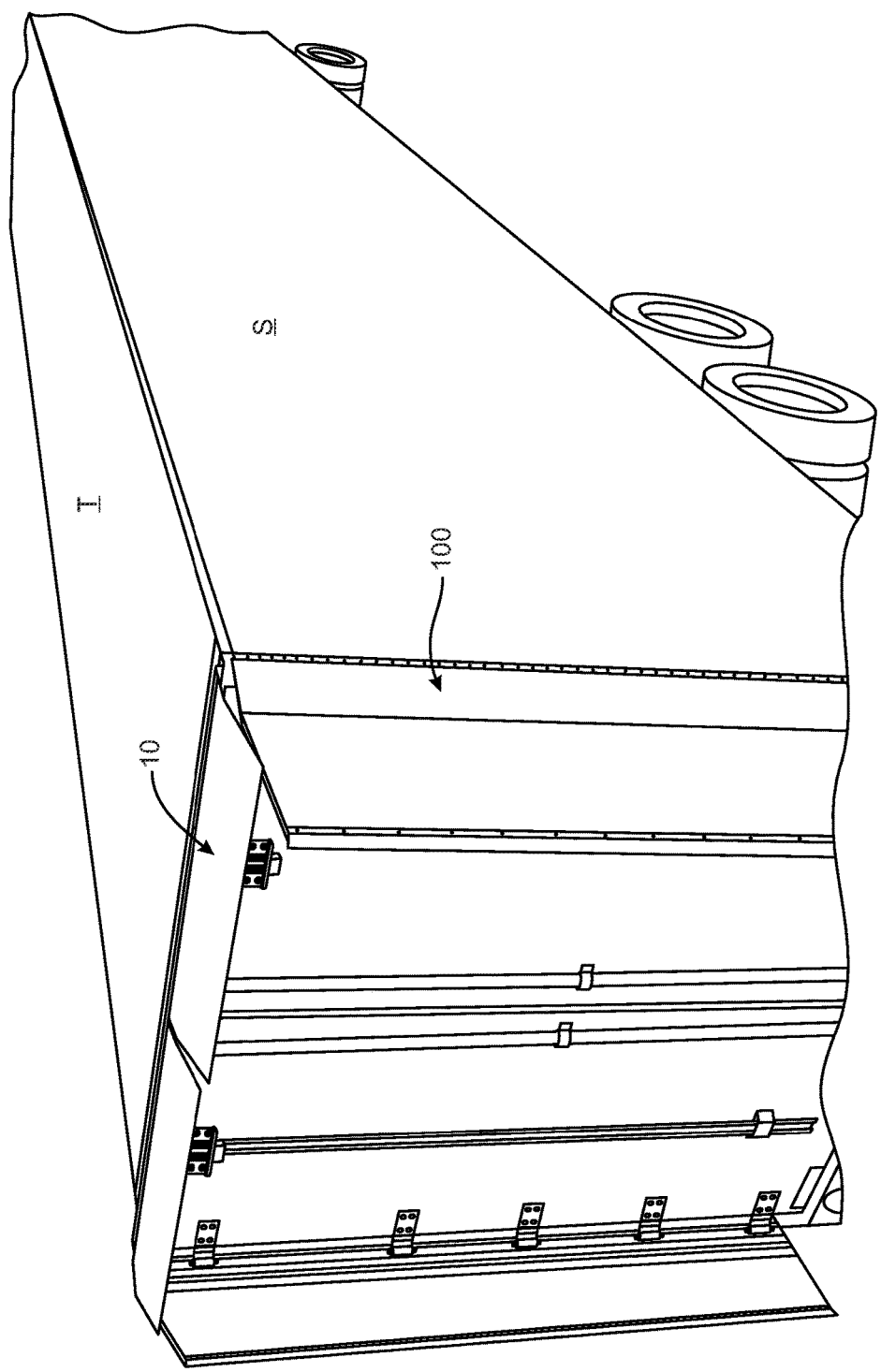
FIG. 19 is a perspective view of the drag reduction device of the present disclosure mounted to a vehicle and in the deployed position.

The bottom link 30 is U-shaped, as shown in FIG. 11 to fit around the collar 28 of the pivot plate 22. The pivot rod 29 extends through the holes 31 in the lower portion of the U-shaped link 30, while an intermediate shaft 33 extends through holes 32 in an upper portion of the link 30. The intermediate shaft also extends through holes 34a in pivot posts 34 and through holes 36 in a lower portion of a mid link 35. The bottom link 30 sits between the two pivot posts 34 while the mid link 35 is U-shaped to fit around the two pivot posts 34. The intermediate shaft 33 is held at its ends by retaining rings, similar to the retaining rings 29a, so that the two links 30, 35 can pivot relative to each other and relative to the pivot posts 34. The pivot posts 34 are spring biased to exert an upward force on the bottom link and mid link, as described further herein.

The mid link 35 receives an upper rod 40 that extends through holes 37 in the upper portion of the link. The upper rod 40 is sized to pass through holes 43 in the upper rear portion of a pair of tri-axle links 42 that flank the bottom link 30 and mid link 35. Again, the upper rod is held in position by retaining rings at the ends of the rod so that the tri-axle links and mid link can pivot relative to each other. The tri-axle links are pivotably mounted to a base plate 50 by a pivot rod 46 passing through pivot holes 45 at the lower portion of the links 42. The pivot rod 46 also passes through a pair of collars 47 on the base plate 50, with the collars 47 configured to sit within the U-shaped tri-axle links 42.

The tri-axle-links 42 receive an upper rod 49 through holes 48 in the upper forward portion of the links. The upper rod 49 also passes through collars 51 (FIGS. 9, 10) in the upper portion of the pivot plate 22 beneath the flange 26. The pivot assembly 21 is thus operable in the form of a four-bar linkage to exert a pivot force on the wing mount 24 based on an upward force applied through the pivot posts 34. This linkage movement manifests itself in shifting the position of the wing mount 24, and thus the top wings 11, 12 mounted thereto, from the deployed position shown in FIG. 13, to a stowed position, shown in FIG. 15. In particular, in the deployed position, the wing 11 is angled downward relative to the top wall T of the vehicle so that the trailing edge 11a is below the level of the top wall. On the other hand, in the stowed position, the wing 11 must be tilted upward so that the trailing edge 11a can slide over the top wall T, as shown in FIG. 15. The pivot assembly 21 is thus configured so that as the rear door D is opened the wing 11 starts to pivot upward, to an intermediate position as shown in FIG. 14B, until it reaches its stowed angle that allows the trailing edge 11a to clear the top wall T of the vehicle.

The upward force applied through the pivot posts 34 is generated by the spring assembly 20. Turning to FIG. 12, the spring assembly 20 is mounted within the base plate 50, which is in turn mounted at the top of the rear door D, since it is ultimately supporting the top wing assemblies to be aligned with the top wall T of the vehicle. The upper portions of the pivot posts 34 extend through bores 66 in a top flange of the base plate 50. Retaining rings 62 limit the range of upward movement of the posts through the bores. The lower portions 52 of the pivot posts 34 extend through corresponding compression springs 54. The springs 54 are seated on a pre-load plate 56 that is affixed to the bottom of the base plate 50. Each spring bears against a corresponding spring washer 61 that bears against a retaining ring 60 mounted on the lower portion 52 of the pivot post 34. The springs are initially compressed to apply a biasing upward force to the pivot posts. Adjustment bolts 58 can adjust the amount of spring force or pre-load applied by the springs 54 by adjusting the position of the pre-load plate 56 relative to the base plate.

When the top wing assembly is in its deployed position the rear door is closed at the rear of the vehicle. The edge 26a of the upper flange 26 contacts the fixed frame R surrounding the door thereby pushing the pivot plate 22 outward away from the vehicle. The pivot assembly 21 controls the movement of the pivot plate so that the plate pivots about the pivot rod 29 to thereby pivot the associated wing 11, 12 downward to the deployed position shown in FIG. 13. This movement also provides a downward force on the pivot posts 34 which in turn applies a compression force to the springs 54 by way of the spring washers 61. The spring force keeps the wing assemblies held tightly in the deployed position even under buffeting and road vibration. The stored energy in the spring is released when the rear door is opened and the pivot plate 22 is no longer in contact with the vehicle body. The springs then provide the upward force on the bottom link 30 and mid link 35 to pivot the wing to its stowed position described above.

Figure 21:
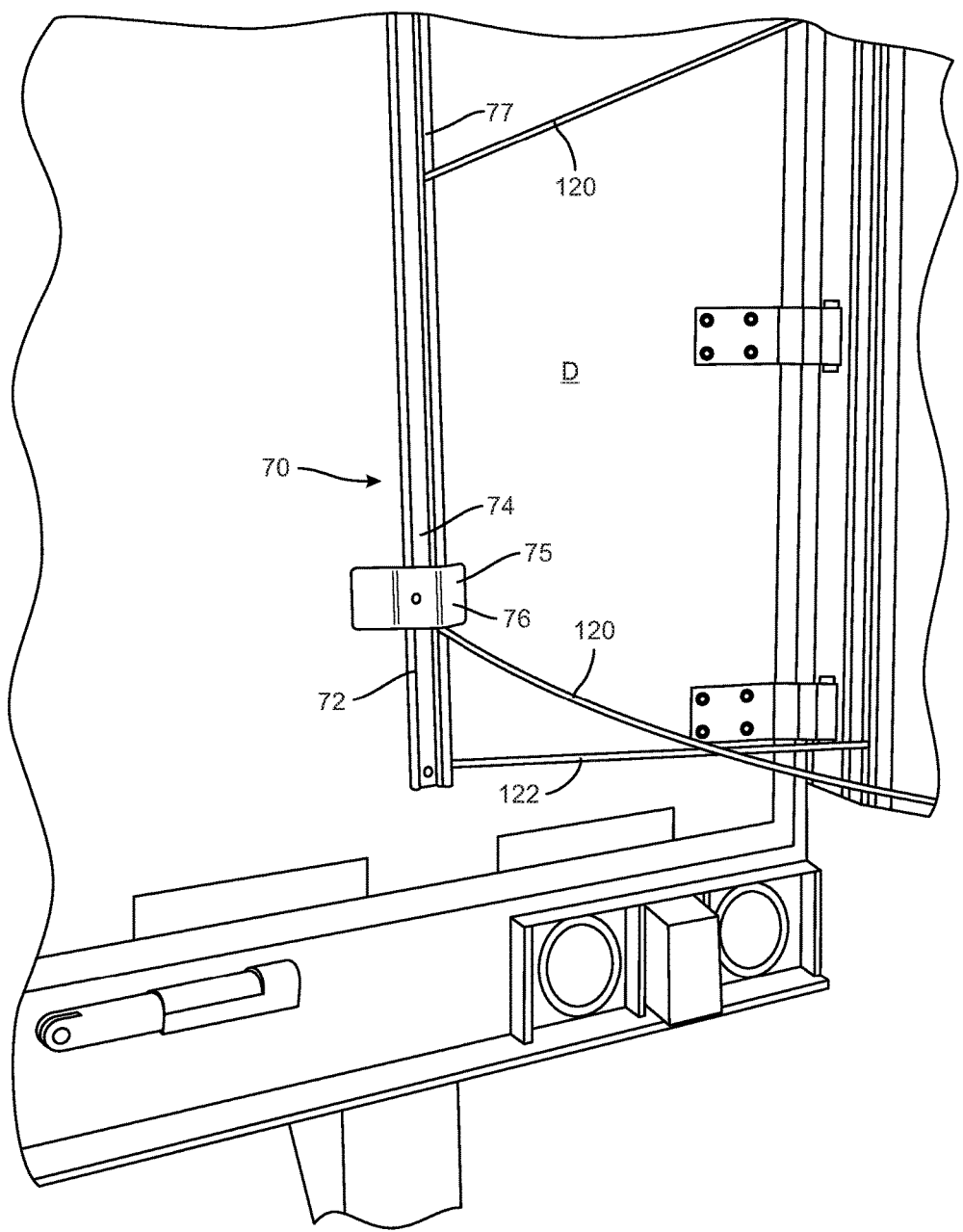
FIG. 21 is a rear view of the lower tether arrangement for the side wing assembly of the drag reduction device shown in the prior figures.
Figure 22:
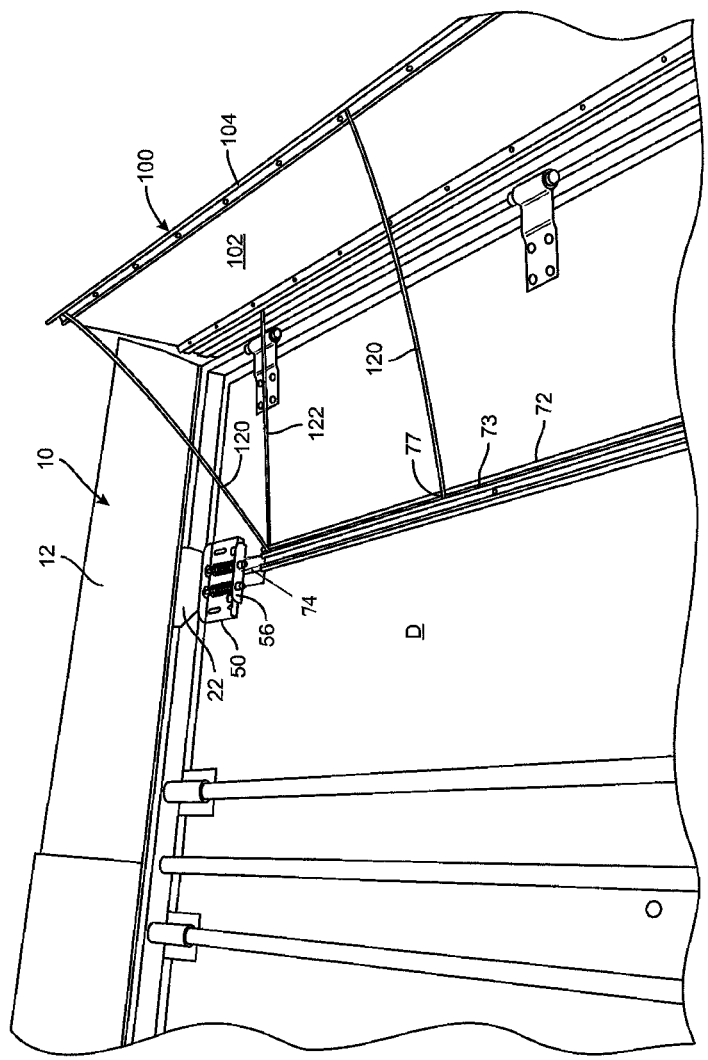
FIG. 22 is a rear view of the upper tether arrangement for the side wing assembly of the drag reduction device shown in the prior figures.

In the event that the spring assembly 20 and/or pivot assembly 12 is jammed, such as due to ice or debris interfering with the components, a manual override assembly 70 is provided, as shown in FIG. 2, that allows the operator to apply an upward force to the pivot posts 34 to pivot the wing assemblies to their upward tilted stowed positions. As shown in FIGS. 21-22, the override assembly 70 includes a lanyard rail 72 that defines a channel 73 extending vertically up the rear door D. A push plate 74 is seated within the channel 73 and is provided with a handle 75 at the bottom of the push plate. The operator manually pushes the handle 75 upward to move the push plate upward into contact with the pre-load plate 56. This upward force pushes the pre-load plate into the springs, which in turn push against the pivot posts to manually force the linkage movements to pivot the wings upward. The handle 77 may be provided with an angled surface 76 that can be contacted by the outer edge of the side wing assembly as the rear door opens.

Turning now to FIGS. 16-18, details of the side wing assemblies 100 are shown. The side wing assemblies each include a panel 102 that may be formed of a composite material. In one embodiment, the panel is generally planar, at least in the stowed position so that the panel can fit neatly in the gap between the opened rear door D and the side wall S of the vehicle. The panel 102 may be configured to bend or bow when in the deployed position. As shown in FIG. 1, the panels 102 are sized to extend substantially along the entire height of the rear door and may even be configured to extend slightly below the door provided it does not interfere with the vehicle lights. An edge plate 104 is affixed to the outboard vertical edge of the panel 102 and may be configured with a curvature for improved aerodynamic efficiency of the side wing assembly 100. The inboard vertical edge of the panel 102 is mated to a hinge plate 106 that defines a vertical hinge pocket 107. The hinge pocket receives a hinge rib 111 of a knuckle panel 110. The hinge plate 106 further includes a hinge plate panel 108 that overlaps the knuckle panel 110. Magnets 112 between the hinge plate panel 108 and the knuckle panel 110 can help hold the panels in their deployed positions shown in FIG. 13.

Figure 20:
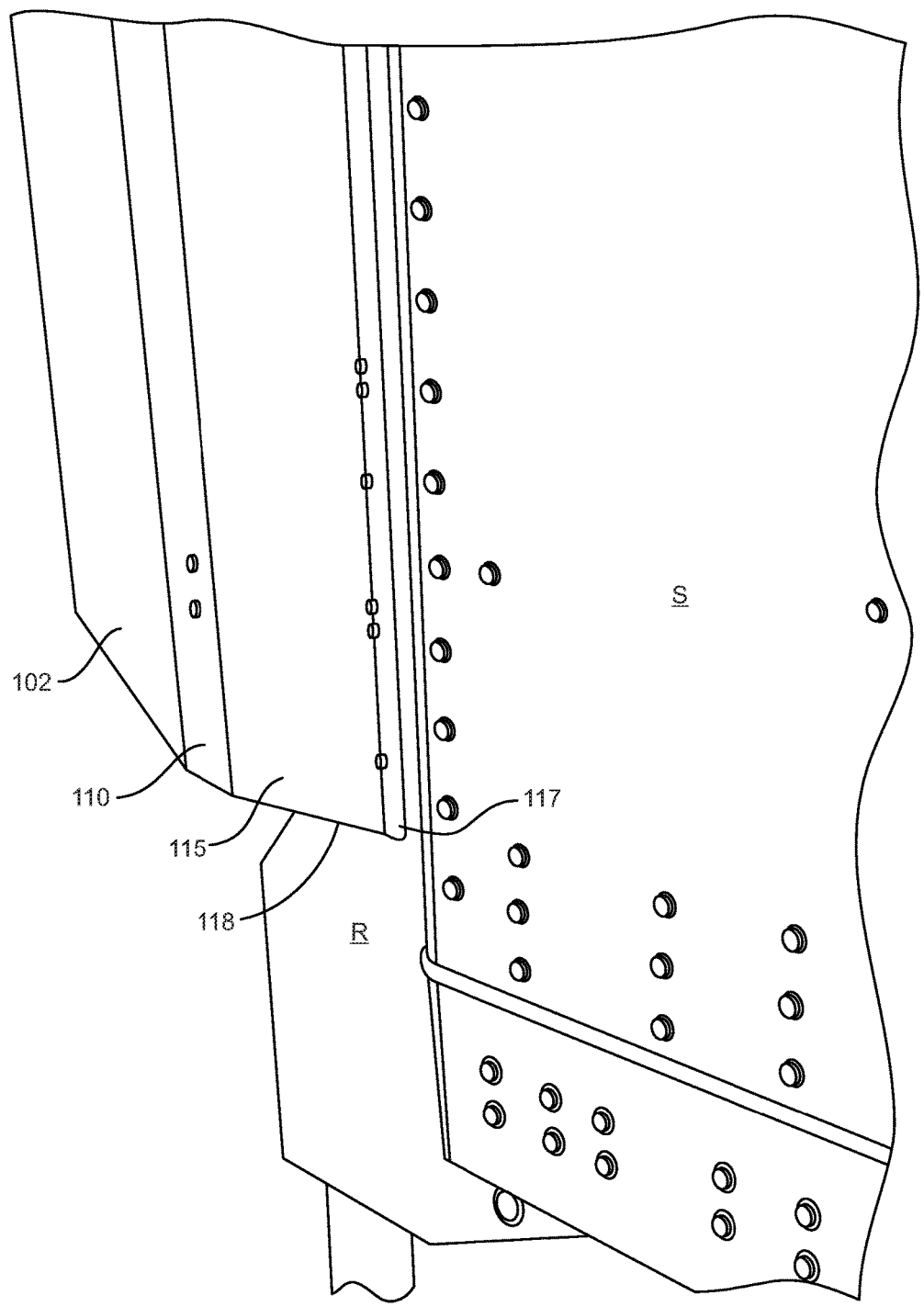
FIG. 20 is an enlarged view of the deployed drag reduction device viewed from the rear of the device.

As illustrated in FIG. 16, the knuckle panel 110 includes its own vertical hinge pocket 113 that receives a hinge rib 116 of a 180° hinge assembly 115. The 180° hinge assembly 115 includes a hinge 117 and a base plate 118 that is affixed to the rear door frame R of the vehicle, as shown in FIG. 20. The hinge assembly 115 can thus pivot 180° from the deployed position shown in FIG. 16 in which the hinge overlaps the base plate 118 to a stowed position in which the hinge is complete open with the hinge rib 116 disposed against the side wall S of the vehicle body. In this position, the hinge rib 111 of the panel 102 allows the panel to pivot to a stowed position generally parallel to the side wall of the vehicle body and overlapping the hinge plate panel 118 and hinge assembly 115.

Figure 23:
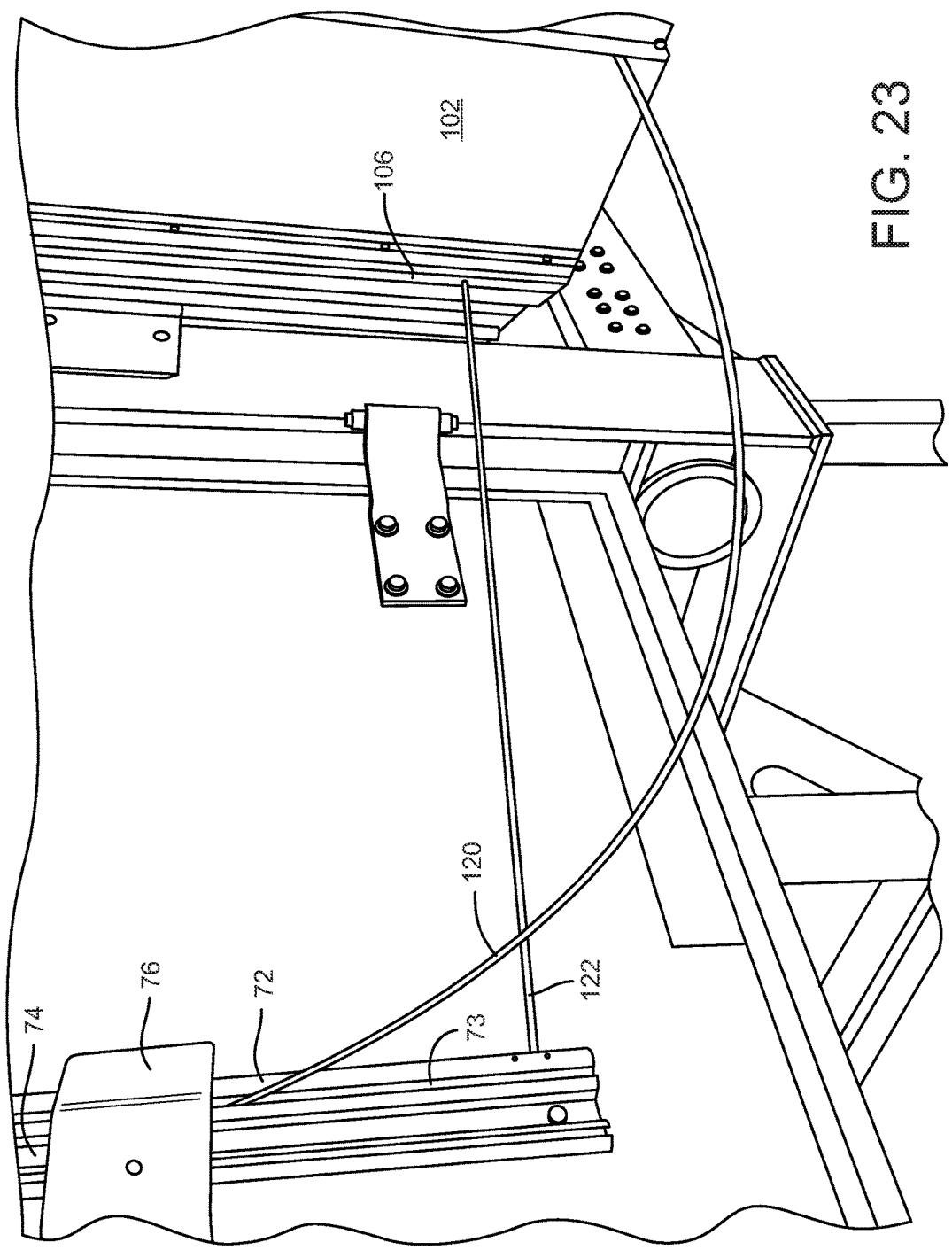
FIG. 23 is a rear view of the lower tether arrangement for the side wing assembly of the drag reduction device shown in the prior figures, shown with the rear door partially open.

As shown in FIGS. 21-23, the side wing assemblies are tethered to the rear door by lanyards 120, 122. The lanyards 120 are connected at one end to the edge plate 104 and at their inboard end to the lanyard rail 72. The lanyards 122 are connected at one end to the hinge plate 107 or to an inboard edge of the panel 102. The lanyards 120, 122 hold the side wing assemblies in their deployed positions as the vehicle is traveling. It is understood that the air flow and air pressures at the rear of the vehicle body automatically cause the composite panel 102 to assume its drag reducing configuration extending rearward from the rear of the vehicle and angled slightly inward relative to the side wall of the vehicle. The lanyards thus prevent the composite panel 102 from pivoting too far outward relative to the side of the vehicle, thereby diminishing the drag reduction performance of the side wing assembly 100.

The edge lanyards 120 can help impart an airfoil curvature to the panel 102 as the air flows over the side wing assemblies. The edge lanyards 120 are also sized to hold the panel 102 at a desirable angle of attack relative to the side wall S of the vehicle. In one embodiment, the panels 102 are angled inwardly from the side walls at an angle of about 14° to provide optimum aerodynamic performance. Other angles may be contemplated. The lanyards 120 are mounted within a channel 77 in the lanyard rail and may be vertically adjustable to adjust the angle of the side wing assembly.

The present disclosure should be considered as illustrative and not restrictive in character. It is understood that only certain embodiments have been presented and that all changes, modifications and further applications that come within the spirit of the disclosure are desired to be protected.

For instance, the spring assembly 20 may incorporate components exhibiting spring-type behavior other than the compression springs 54. For instance, the spring assembly can incorporate a pneumatic or hydraulic cylinder capable of generating the force to pivot the pivot plate 22, and ultimately the wings 11, 12 as described above.

Furthermore, the pivot plate 22 can be mounted directly on the rear door D rather than indirectly mounted on the door through the base plate 50. The spring assembly 20 can also be mounted on the rear door, such as by a flange arrangement separate from the base plate.

What is claimed is:

1. A drag reducing device for a vehicle body having a top wall and a door pivotably mounted to the rear of the body to open toward a side wall of the body, the device comprising:
    a wing sized and configured to turn airflow across the top wall of the body, the wing having a trailing edge and a proximal edge;
    a base plate mounted to the door below the top wall of the vehicle body;
    an assembly for pivoting the wing so that said wing is pivoted upward from a deployed position in which the trailing edge is below the top wall of the vehicle body to a stowed position in which the trailing edge is above the top wall of the vehicle body, the spring assembly including;
        a mounting plate on which said wing is mounted adjacent the proximal edge of said wing;
        a pivot plate fastened to said mounting plate and arranged to contact the vehicle body when the door is closed, said pivot plate pivotably connected to the door so that said pivot plate is pivotable between a first position in which the pivot plate contacts the vehicle body corresponding to the deployed position of said wing, an intermediate position in which the pivot plate is moved with the door away from the vehicle body toward the side wall of the vehicle body and a second position corresponding to said stowed position of said wing; and
        a spring member arranged between said base plate and said pivot plate to bias the pivot plate to the second position.

2. The drag reducing device of claim 1, wherein said pivot plate is pivotably mounted to said base plate.

3. The drag reducing device of claim 2, wherein said assembly for pivoting the wing further includes a linkage assembly connecting said pivot plate to said base plate.

4. The drag reducing device of claim 2, wherein:
    said assembly for pivoting the wing further includes;
        at least one elongated post slidably supported by said base plate;
        a pre-load plate fastened to said base plate;
        a spring washer fastened to said each of at least one elongated post; and
        said spring member is a spring concentrically disposed around each of said at least one elongated post between said pre-load plate and said spring washer, said spring being initially compressed to apply a biasing upward force to each of said at least one elongated post; and
    said pivot plate is connected to said at least one elongated post by said linkage assembly, said linkage assembly configured to convert upward movement of said at least one elongated post under force of said spring to pivoting movement of said pivot plate.

5. The drag reducing device of claim 4, wherein said pre-load plate is adjustably fastened to said base plate to adjust the biasing upward force exerted by the spring on each of said at least one elongated post.

6. The drag reducing device of claim 4, wherein said assembly for pivoting the wing includes two elongated posts with a corresponding spring concentrically disposed thereon.

7. The drag reducing device of claim 1, further comprising a manual override operable to pivot said wing to said stowed position after a failure of said spring member, said manual override including a push rod slidably mounted to the door and arranged to push the pre-load plate upward.

8. The drag reducing device of claim 7, wherein said manual override further includes:
   an elongated track fastened to the door below said base plate;
   said push rod slidably disposed within said track with an upper end of said push rod adjacent said pre-load plate, said push rod having a first position in which said upper end of said push rod is not in contact with said pre-load plate and slidable within said track to a second position in which said push rod pushes said pre-load plate upward, thereby pushing said at least one elongated post upward; and
   a handle fastened to a lower end of said push rod for manual activation of said push rod.

9. A drag reducing device for a vehicle body having a top wall and a door pivotably mounted to the rear of the body to open toward a side wall of the body, the device comprising:
   a wing sized and configured to turn airflow across the top wall of the body, the wing having a trailing edge and a proximal edge;
   an assembly mounted to the door and configured for pivoting the wing so that the trailing edge of said wing is pivoted upward to a position above the top wall of the vehicle body when the door is open and for pivoting the wing so that the trailing edge of said wing is pivoted downward to a position below the top wall of the vehicle body when the door is closed.

* * * * *